United States Patent [19]
Cybularz et al.

[11] Patent Number: 5,941,682
[45] Date of Patent: Aug. 24, 1999

[54] DRAFT TUBE PERIPHERAL PLENUM

[75] Inventors: Joseph M. Cybularz, Jacobus; Robert D. Steele; Irvin E. Scott, Jr., both of York; Richard K. Fisher, Jr., Jacobus, all of Pa.

[73] Assignee: Voith Hydro, Inc., York, Pa.

[21] Appl. No.: 08/899,987

[22] Filed: Jul. 24, 1997

[51] Int. Cl.⁶ ................................................. F04D 29/38
[52] U.S. Cl. ............................................................ 415/115
[58] Field of Search ................................... 415/114, 115, 415/116, 121.3, 1

[56] References Cited

U.S. PATENT DOCUMENTS

| | | |
|---|---|---|
| 1,606,887 | 11/1926 | Moody . |
| 1,977,036 | 10/1934 | Biggs ......................................... 415/1 |
| 2,262,191 | 11/1941 | Moody . |
| 2,300,748 | 11/1942 | Rheingans . |
| 3,047,267 | 7/1962 | Peyrin . |
| 3,238,534 | 3/1966 | Hartland . |
| 3,253,816 | 5/1966 | Sproule ....................................... 415/1 |
| 3,292,901 | 12/1966 | Donaldson . |
| 4,003,674 | 1/1977 | Swiecicki . |
| 4,142,825 | 3/1979 | Koeller . |
| 4,142,826 | 3/1979 | Koeller . |
| 4,146,351 | 3/1979 | Koeller . |
| 4,158,525 | 6/1979 | Kawase et al. ............................. 415/1 |
| 4,515,524 | 5/1985 | Fisher, Jr. . |
| 4,629,393 | 12/1986 | Kuwabara et al. ......................... 415/1 |
| 4,898,512 | 2/1990 | Geffs . |
| 5,525,269 | 6/1996 | Connolly et al. . |

*Primary Examiner*—John Kwon
*Attorney, Agent, or Firm*—Foley & Lardner

[57] ABSTRACT

A shrouded turbine for enhancing the levels of dissolved gas such as oxygen in water flowing therethrough. The turbine comprises a rotatably mounted runner within a stationary casing. The casing includes a head cover, a discharge ring and a draft tube which together define a water passage extending from an upstream inlet port to a downstream outlet port. A gas chamber substantially surrounds a peripheral portion of the draft tube, and a gas discharge slot connects the gas chamber to the water passage. The slot is substantially continuous and extends substantially about an entire circumference of the water passage. An oxygen containing gas source is connected to the gas chamber, and the gas pressure in the gas chamber is greater than a water pressure in the water passage adjacent the slot. Gas is discharged from the slot into the water passage so that the level of dissolved oxygen in the water discharged from the downstream port is increased. The size of the slot may be adjustable, and a control system may be provided to automatically control the size of the slot.

39 Claims, 9 Drawing Sheets

DRAFT TUBE PERIPHERAL PLENUM

FIELD OF THE INVENTION

The present invention relates generally to hydroelectric turbine installations. More particularly, this invention pertains to hydroelectric installations with means for enhancing the level of dissolved gas in water passing through the turbine.

BACKGROUND OF THE INVENTION

A significant environmental problem for many hydroelectric facilities is the water quality of turbine discharges. The primary water quality problem is often low dissolved oxygen (DO) levels which occur seasonally. During the summer months, thermal stratification of the reservoir produces a surface layer of less dense, warm water with relatively high dissolved oxygen and a lower, relatively cold oxygen-depleted layer resulting from the decay of organic material on the reservoir bottom. Because hydraulic turbines draw their discharges from the lower layer, this can create water quality problems downstream of the facility.

Relicensing and rehabilitation of a hydroelectric facility offer an opportunity to address environmental and industrial development concerns over dissolved oxygen levels and other water quality regulations which affect hydropower releases. Rehabilitating an existing hydroelectric facility may, as explained in co-pending U.S. patent application Ser. No. 08/733,366 filed Oct. 17, 1996 to the same assignee, include replacement of the runner. Replacing an existing runner with a new runner having integral passages, and providing air through existing structures or new structures of the installation to the integral passages, enhances dissolved oxygen levels in the water without material losses in efficiency or substantial increases in cost of rehabilitation.

Another known way to improve water quality in turbine installations having shrouded runners is to supply air to the annular chambers or spaces formed between the stationary casing and the runner crown and band. In co-pending U.S. patent application Ser. No. 08/805,286 filed Feb. 25, 1997 to the same assignee, such chambers are specifically configured to promote the continuous mixing of a cloud of small gas bubbles and to maximize the residency time of the bubbles.

It is also known to admit air through the foundation to the draft tube. Providing air admission to the draft tube has heretofore been done, however, primarily to quiet pressure pulsations and cavitation problems caused by part load or overload vortices within the draft tube. In some designs, this was accomplished by providing an annular air/water mixture chamber around the draft tube and a finite number of discrete outlets connecting the chamber to the draft tube. Although this compensated somewhat for shifting local pressure pulsations in the tube, no attempt was made to ensure an even distribution of the gas into the tube, as is desirable to increase dissolved oxygen levels in the turbine release.

Accordingly, it appears desirable to develop new gas distribution arrangements in the draft tube to improve the water quality of hydropower releases, and thereby as an example increase the survivability of fish downstream of such turbine installations.

SUMMARY OF THE INVENTION

The present invention enhances the level of dissolved gas in water flowing through a water passage of a turbine installation.

A turbine installation in accordance with one aspect of the invention includes a stationary casing and a runner rotatably mounted therein. The casing includes a head cover, a discharge ring and a draft tube, which together define the water passage extending from an upstream inlet port to a downstream outlet port. A gas chamber substantially surrounds a peripheral portion of the draft tube, and a gas discharge slot connects the gas chamber to the water passage. The slot is substantially continuous and extends substantially about an entire circumference of the water passage. An oxygen containing gas source is connected to the gas chamber and includes means for maintaining a gas pressure in the gas chamber at greater than a water pressure in the water passage adjacent the slot. Gas is discharged from the slot into the water passage so that the level of dissolved oxygen in the water discharged from the downstream port is increased.

According to a preferred aspect of the present invention, the gas discharge slot is a continuous annular gap which circumscribes the draft tube.

According to further aspect of the invention, the size of the gap forming the gas discharge slot is adjustable, and a control system may be advantageously provided to automatically control the size of the gap.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and.

DETAILED DESCRIPTION OF A PREFERRED EXEMPLARY EMBODIMENT

The present invention relates generally to hydroelectric installations having turbines provided with features for enhancing the level of a dissolved gas, such as oxygen, in water flowing through the turbines.

Figure 1:
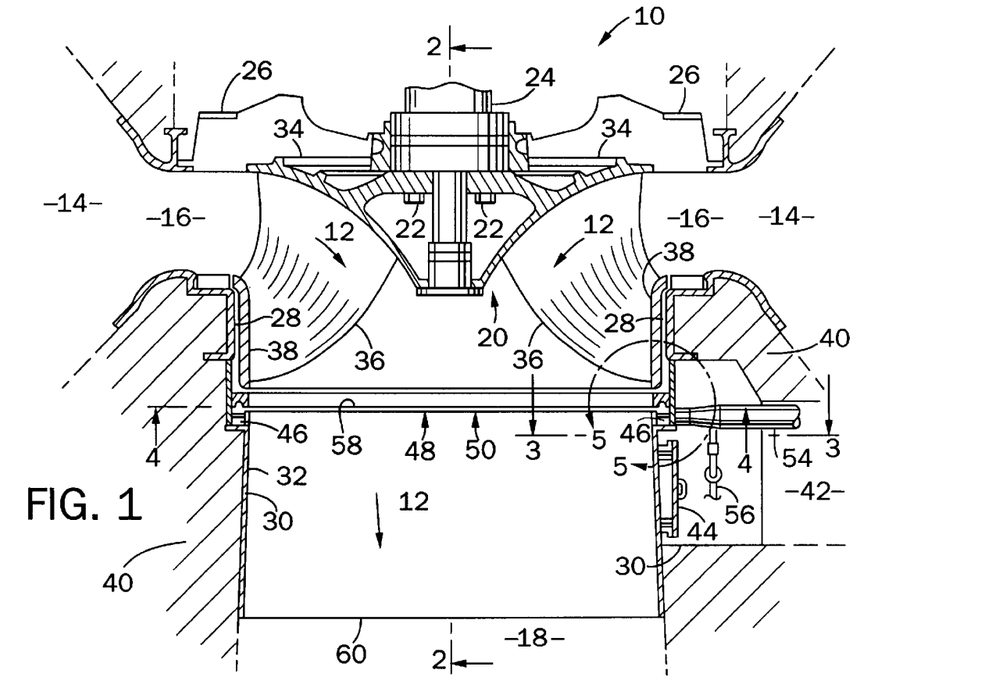
FIG. 1 is an elevational view, partially in cross-section, of a Francis turbine including a rotatably mounted runner and a gas inlet pipe leading to a plenum chamber surrounding a peripheral portion of the draft tube adjacent the runner.
Figure 2:
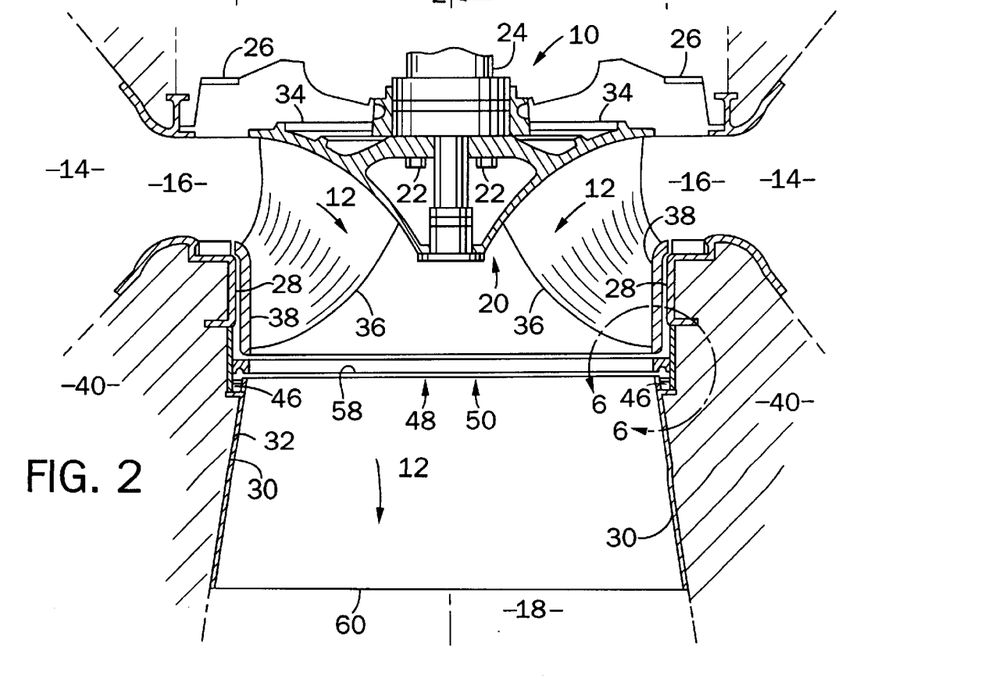
FIG. 2 is an elevational view, partially in cross-section, of the turbine of FIG. 1 taken along the line 2—2 shown in FIG. 1.

Referring to FIGS. 1 and 2, a portion of a hydroelectric turbine installation generally designated as 10 comprises a water passage 12, in which water flows from a source 14 in fluid communication with an upstream inlet port 16, to a lower elevation downstream outlet port 18. Installation 10 is illustrated as a Francis turbine having a runner 20 secured by bolts 22 to a shaft 24 supported for rotation therewith, a head cover 26, a bottom discharge ring 28 and a draft tube 30. Head cover 26, discharge ring 28 and draft tube 30 are stationary components which together form a casing 32 through which the water flows. Runner 20 includes a crown 34 and a plurality of circumferentially spaced runner blades 36 extending therefrom to an enclosing band 38 substantially concentric with crown 34. Installation 10 also includes other components (e.g., stay vanes and wicket gates) typical for such turbines which need not be shown for describing the present invention.

Figure 3:
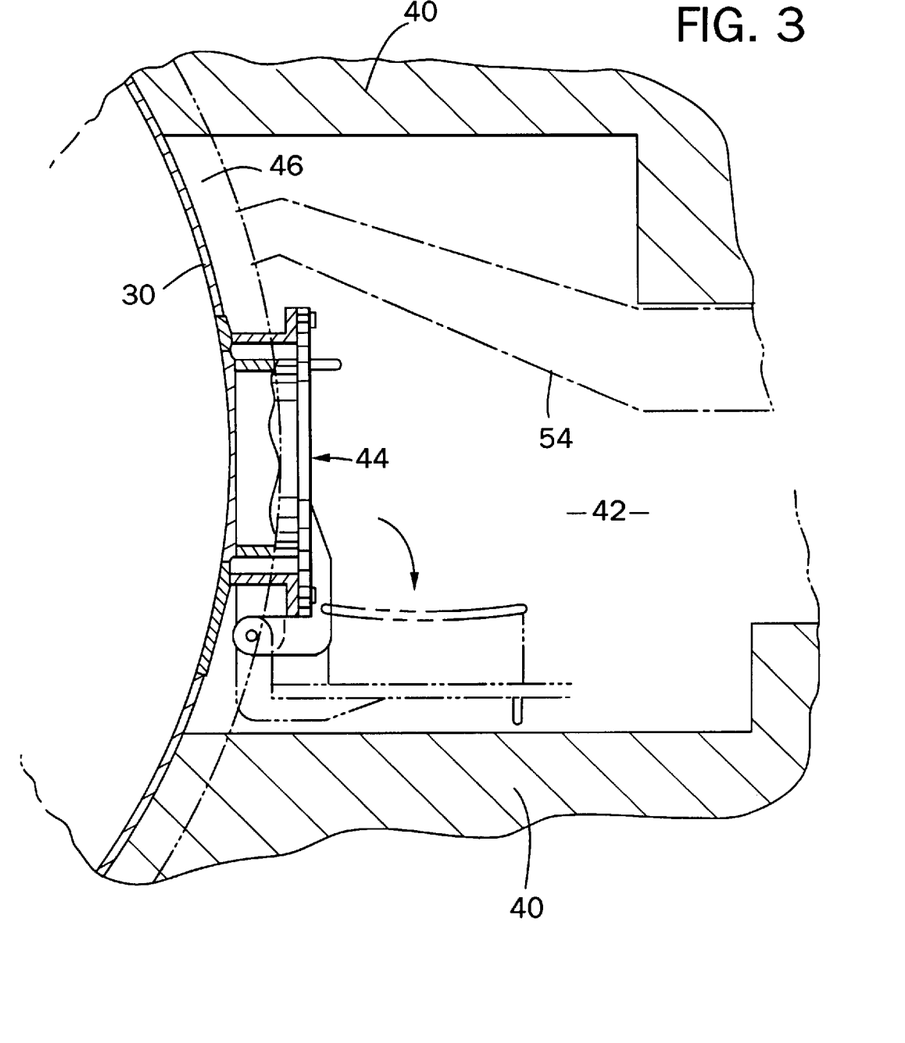
FIG. 3 is an enlarged sectional view of the turbine of FIG. 1 taken along the line 3—3 shown in FIG. 1, showing the portion of the draft tube and foundation adjacent the mandoor.

Various components of installation 10 (primarily discharge ring 28 and draft tube 30) are securely set within a concrete foundation 40. Foundation 40 includes a man-passage 42 which leads to a mandoor 44 located on one side of draft tube 30, providing worker access to the interior of casing 32 without removal of runner 20. Extending around a periphery of draft tube 30, and set within foundation 40, is a plenum chamber 46 which preferably completely surrounds draft tube 30. Plenum 46 has a discharge opening 48 leading to the interior of draft tube 30, and opening 48 is preferably a continuous slot 50 which extends uninterrupted around the entire perimeter of draft tube 30. A gas source such as atmospheric air is in communication with plenum 46 through a gas inlet pipe 54 which conveniently extends through man-passage 42 (see FIG. 3). Although installation 10 is illustrated with only one gas inlet pipe 54, additional inlet pipes could be provided around the perimeter of draft tube 30 if desired, preferably at spaced locations around draft tube 30. In addition, although only one plenum 46 is shown, additional plenums could be provided above or below plenum 46. To remove water which may occasionally back up into gas inlet pipe 54, an optional drain pipe 56 is conveniently provided.

Figure 4:
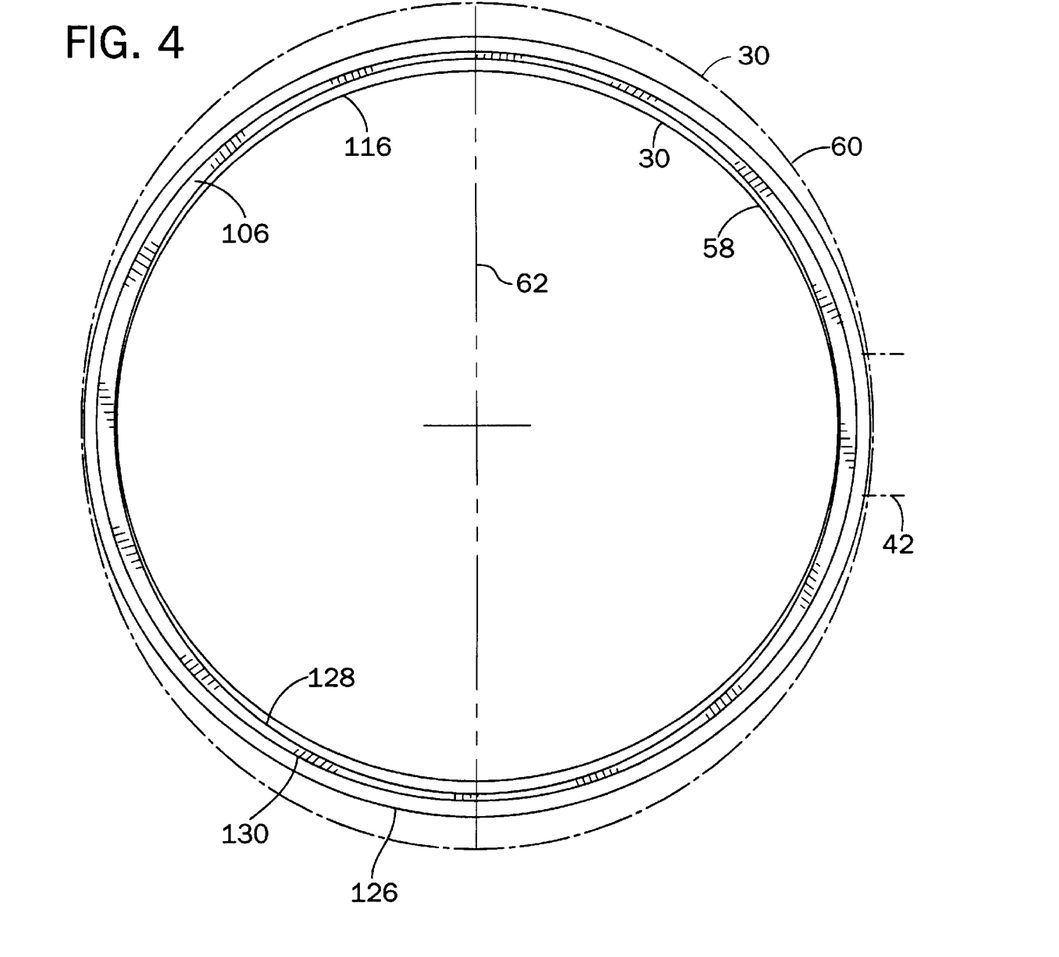
FIG. 4 is a schematic representation of a sectional view through the plenum chamber of the turbine of FIG. 1 taken along the line 4—4 in FIG. 1, with the phantom line illustration of the discharge tube superimposed thereon for illustrative purposes.

In the illustrated turbine, draft tube 30 is substantially circular in cross-section at an upstream end 58 thereof and becomes noticeably more elliptical in cross-section toward a downstream end 60. The elliptical downstream end 60 of draft tube 30 has a long axis 62 which is transverse to man-passage 42 (see FIG. 4). Of course, the particular cross-sectional shape and orientation (e.g., horizontal or vertical) of the draft tube is not critical, but in general the area normal to the flow will increase as the distance from the runner increases (i.e., conical shape).

Turning now to FIGS. 5–11, plenum 46 will be described in more detail. Installing a plenum such as plenum 46 described herein in an existing turbine installation will generally require removal of an upper portion of the draft tube along with a 360° surrounding portion of concrete from the foundation. However, since the necessary modifications would be obvious to one skilled in the art from the description of plenum 46 provided herein, and would also depend somewhat on the particulars of the installation, the details of how to retrofit the plenum on an existing installation are not provided.

Regardless whether turbine installation 10 is new or pre-existing, plenum 46 can be integrally formed with draft tube 30. Preferably, plenum 46 is formed between a lower end 64 of discharge ring 28 and an upper end 66 of a conical wall 68 forming the major portion of draft tube 30. More specifically, plenum 46 is defined by a liner plate 70, a discharge ring barrel 72, an annular plate 74, and an adjustable ring assembly 76. Liner plate 70 has a diameter and shape such that it extends upwardly from conical wall 68 to provide draft tube 30 with a relatively smooth and uninterrupted inner surface 78. Similarly, discharge barrel 72 has a diameter and shape such that it extends downwardly from lower end 64 of discharge ring to provide a mixing chamber 80 (formed between the relatively rotating components of runner band 38 and discharge ring 28) with a relatively smooth and uninterrupted outer surface 82. Liner plate 70 thus forms a continuation of draft tube 30, and discharge barrel 72 forms a continuation of discharge ring 28. Annular plate 74 is welded between liner 70 and barrel 72 to seal off the lower end of plenum 46, and ring assembly 76 adjustably closes the top end. Finally, a plurality of radially extending support bars 84 are provided inside plenum 46 adjacent the top end thereof, spaced at 20° increments.

Ring assembly 76 comprises a support ring 86, an adjustment ring 88, a shim plate 90, a gas deflector ring 92 and a plurality of cover plates 94. Support ring 86 is fixedly secured by upper and lower weld lines 96 and 98 to discharge barrel 72 just above inlet pipe 54. Adjustment ring 88 is releasibly secured to support ring 86 by a plurality of bolts 100 at radially spaced locations. Adjustment ring 88 has a downwardly depending portion 102, and a plurality of bolts 104 extend downwardly through portion 102 (and optionally shim 90) to threadedly engage gas deflector ring 92, thereby forming slot 50. Slot 50, therefore, is a continuous or annular gap formed between a lowermost surface 106 of cylindrical deflector ring 92 and an uppermost surface 108 of cylindrical liner plate 70. Without being limiting in any way, slot 50 may be adjusted in height from approximately 0.0 to 1.0 inches, more or less.

Figure 12A:
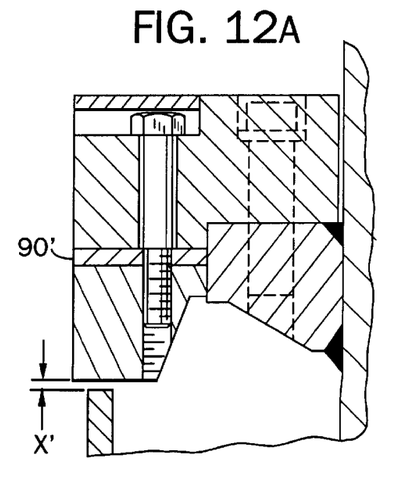
FIG. 12A is an enlarged cross-sectional view of the ring assembly with a relatively thick spacer defining a relatively small gap.
Figure 12B:
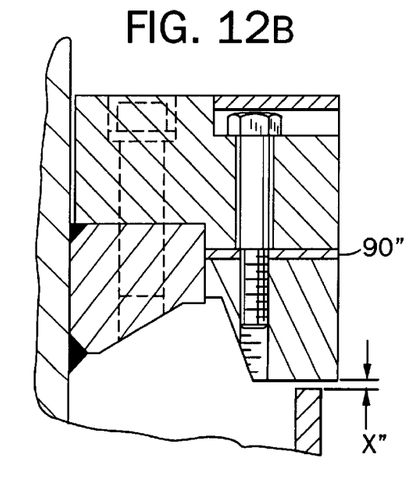
FIG. 12B is an enlarged cross-sectional view of the ring assembly with a relatively thin spacer defining a relatively large gap.

Shim 90 allows a worker to easily adjust the size of slot 50 without the need to remove the runner, as will be clear from the discussion further below. Of course, a relatively thick shim 90' provides a relatively narrow gap X' (see FIG. 12A), while a relatively thin shim 90" provides a relatively wide gap X" (see FIG. 12B), and no shim at all provides the maximum gap. Thus, slot 50 is adjustable between a maximum aeration producing position in which deflector ring 92 is retracted as far as possible from liner plate 70 (i.e., no shim), and a position in which deflector ring 92 abuts liner plate 70 and slot 50 is essentially closed, thereby eliminating most energy losses which may be caused from an open position. Accordingly, because slot 50 can be fully obstructed, a resulting advantage over prior art gas discharge openings is that little or no additional parasitic losses are caused in draft tube 30 when it is no longer necessary or desirable to increase dissolved gas for some reason. One such reason explained in the background discussion above is that usually there is less need to increase the dissolved oxygen level during the winter months than the summer months.

Figure 8:
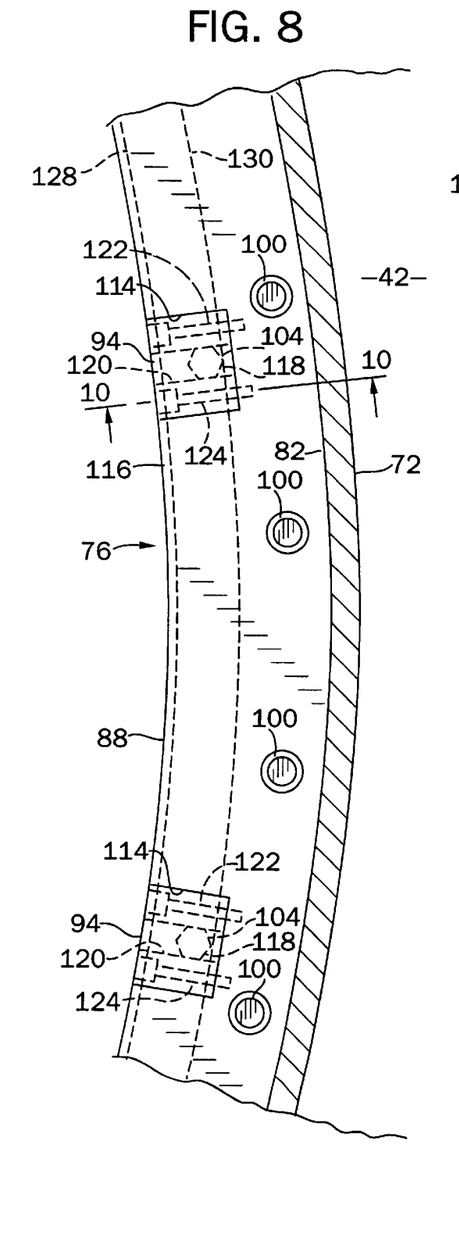
FIG. 8 is a top plan view of the ring assembly forming the plenum chamber of the turbine of FIG. 1 taken along the line 8—8 shown in FIG. 5.
Figure 9:
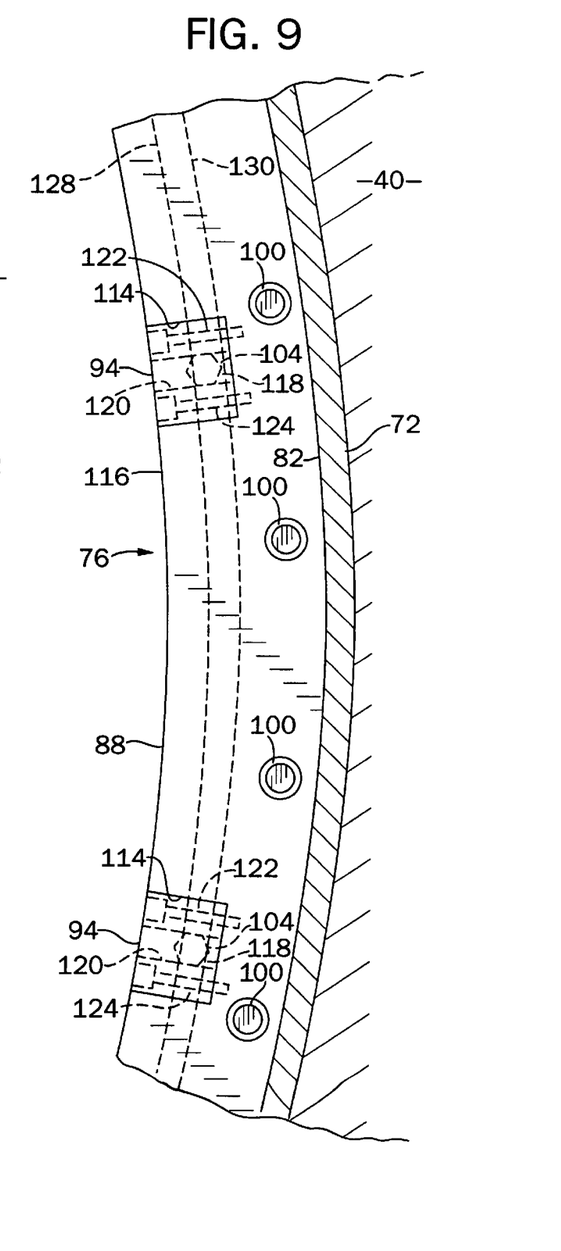
FIG. 9 is a top plan view of the ring assembly forming the plenum chamber of the turbine of FIG. 1 taken along the line 9—9 shown in FIG. 6.
Figure 10:
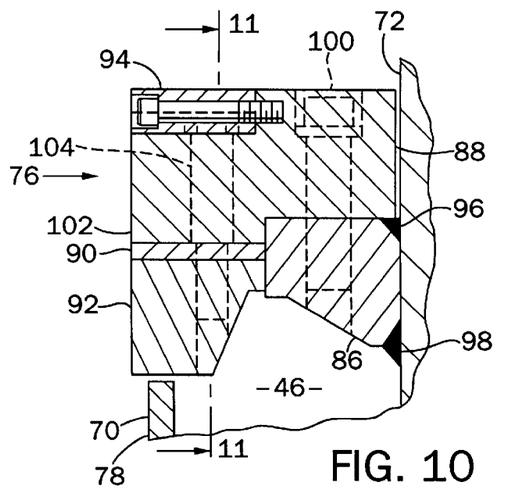
FIG. 10 is an enlarged cross-sectional view of the ring assembly forming the plenum chamber, taken along the line 10—10 shown in FIG. 8.
Figure 11:
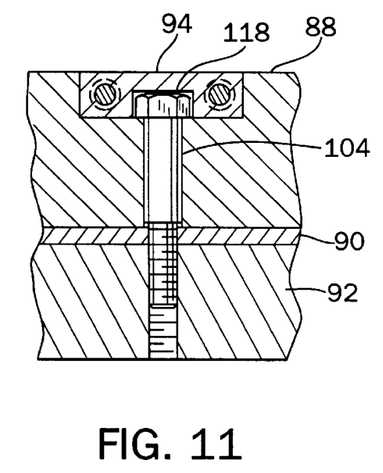
FIG. 11 is an enlarged sectional view of the ring assembly taken along the line 11—11 shown in FIG. 10.

Each cover plate 94 is a thin, rectangular plate configured to slide into one of a plurality of matching, radially spaced cutouts 114 formed along an upper, radially inward edge 116 of adjustment ring 88. Each cutout 114 is centered over a head 118 of one of the plurality of bolts 104 securing the sandwich of adjustment ring 88, shim 90, and deflector ring 92 together. Accordingly, each cover plate 94 when inserted into cutout 114 covers bolt head 118 to create a smooth transition for water flowing from mixing chamber 80 into the primary or working waterflow which has passed through runner 20. Cover plates 94 provide two other functions as well. First, each cover plate 94 has a downwardly opening slot 120 with a width slightly larger than the width of head 118 so that bolt 104 is locked in position when cover plate 94 is in place. Second, cover plate 94 is easily removed by a worker standing on a working platform (not shown) situated in draft tube 30 to allow sufficient clearance beneath runner 20 to get a wrench on each head 118, thereby allowing bolts 104 to be turned to adjust the size of slot 50. Each cover plate 94 is held in place by a pair of horizontally oriented bolts 122, 124 situated on either side of the associated bolt 104. Finally, it should be noted that shim 90 is preferably a plurality of shim sections which substantially fill the entire annular space between rings 88 and 92 when installed, and that sections of shims of different or gradually tapering thicknesses can be used to vary the size of slot 50 around the circumference. Accordingly, it is possible to vary the size of slot 50 around the circumference as a function of increased distance from gas inlet pipe 54.

Figures 5, 7:
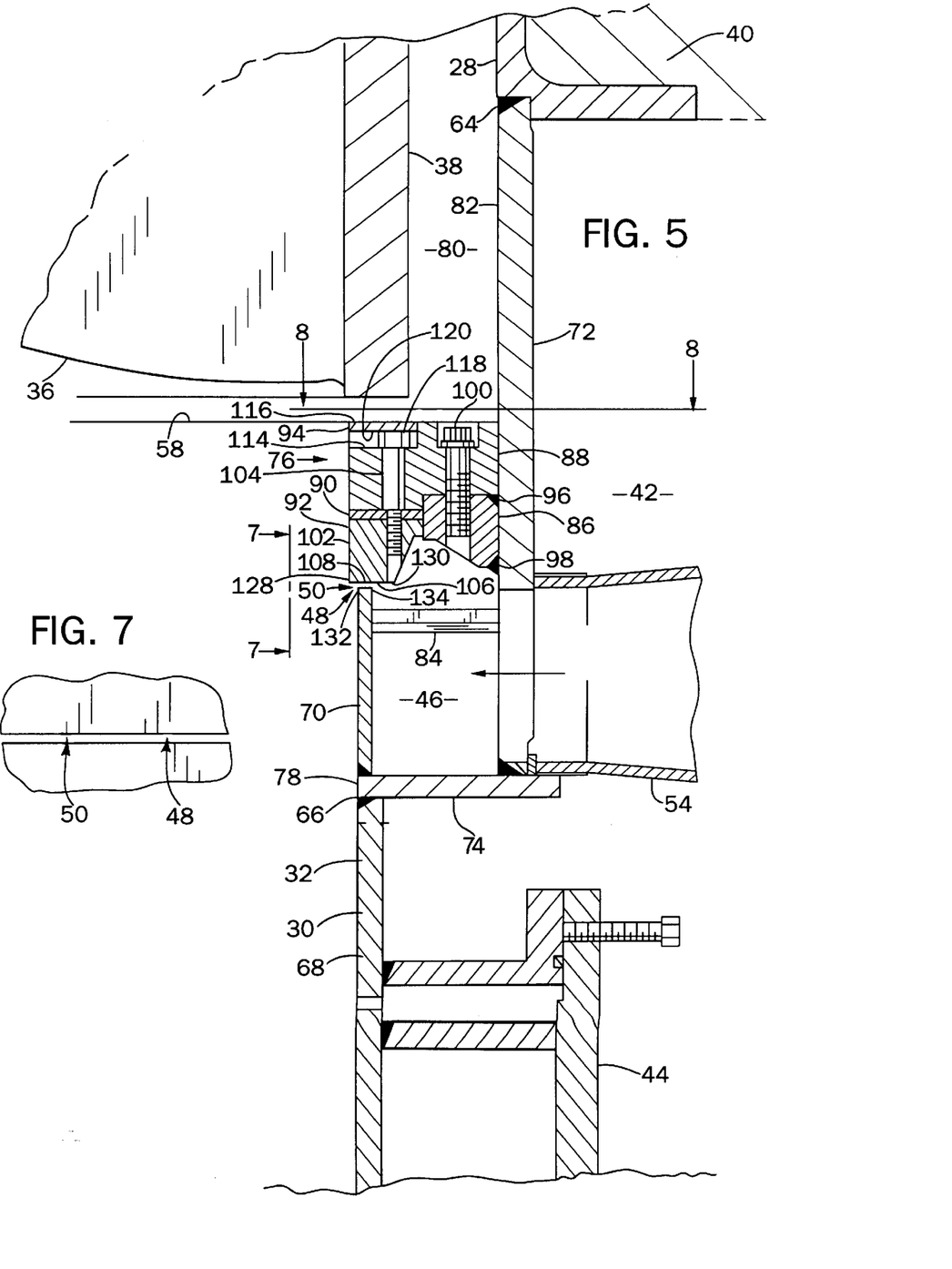
FIG. 5 is an enlarged cross-sectional view of the plenum chamber of the turbine of FIG. 1 showing the portion thereof bounded by the line 5—5 shown in FIG. 1.
FIG. 7 is an enlarged view of the gas discharge slot of the turbine of FIG. 1 taken along the line 7—7 shown in FIG. 5.
Figure 6:
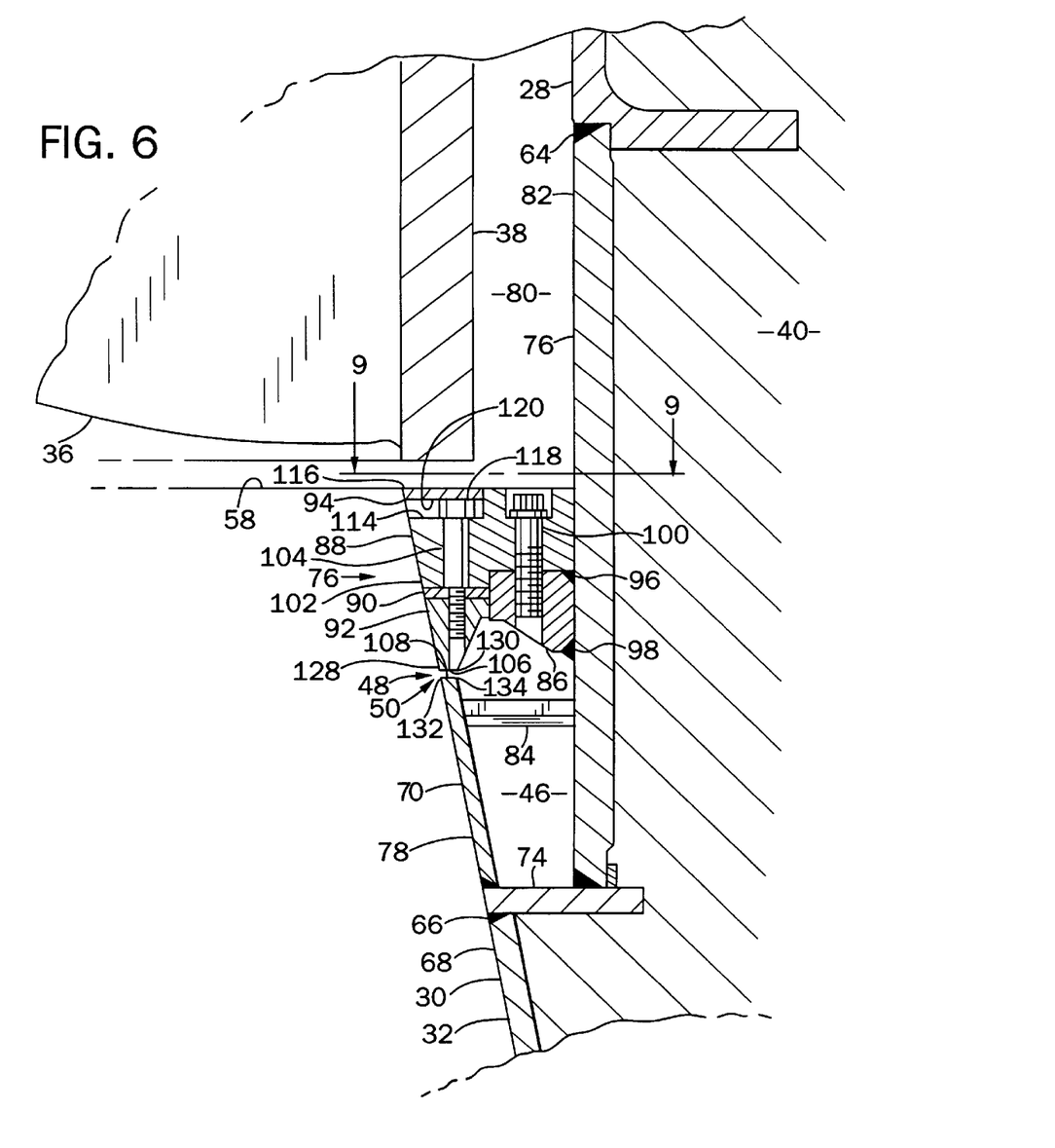
FIG. 6 is an enlarged cross-sectional view of the plenum chamber of the turbine of FIG. 1 showing the portion thereof bounded by the line 6—6 shown in FIG. 2.

Deflector ring 92 has an inner edge 128 and an opposed outer edge 130 along its lowermost surface 106, and liner plate 70 has an inner edge 132 and an opposed outer edge 134 along its uppermost surface 108. Inner edge 128 of deflector ring 92 is upstream of inner edge 132 of liner plate 70, slightly smaller in diameter, and substantially concentric therewith. Stated differently, deflector ring 92 is offset radially inwardly of liner plate 70 (e.g., by about 0.0 to 0.5 inches). Thus, as water flows through water passage 12 and passes by slot 50, the sudden expansion in diameter at that point creates a pressure drop which tends to draw a larger quantity of gas from plenum chamber 46. In addition, slot 50 is situated at a distance downstream of runner 20 at which the water pressure is already at a local minimum, which further assists gas discharge. Of course, a pump or compressor (such as described below with reference to FIG. 14) may be used to force gas from plenum 46 through slot 50 and into draft tube 30.

Figure 13:
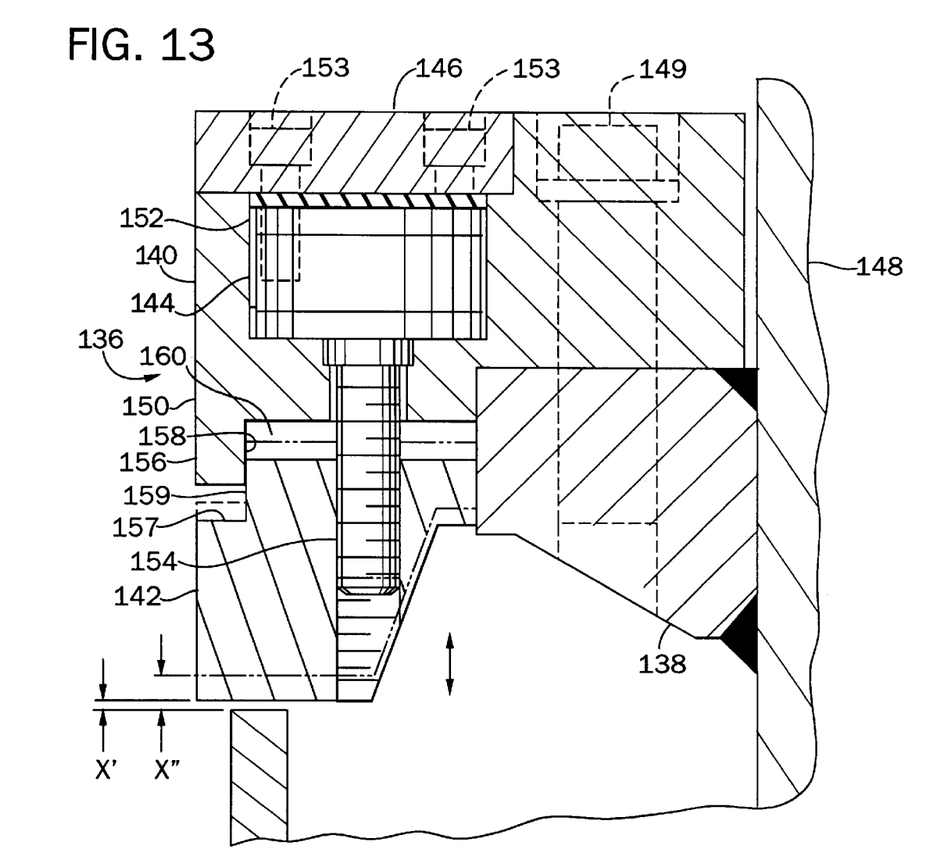
FIG. 13 is an enlarged cross-sectional view of the ring assembly with a pancake cylinder for automatically adjusting the slot size.

Referring to FIG. 13, an alternative embodiment of an adjustable ring assembly 136 will now be described. Ring assembly 136 is adjusted to produce a desired slot size by either a manual control (not shown) located remote from the water passage or by a control system with gas sensors as will be described below with reference to FIG. 14. Ring assembly 136 comprises a support ring 138, an adjustment ring 140, a gas deflector ring 142, a plurality of actuators (illustrated as pancake cylinders 144) and a plurality of cover plates 146. Of course, a hydraulic or pneumatic feed line (not shown) is also provided to couple pancake cylinder 144 with a working fluid supply. Support ring 138 is welded to a discharge barrel 148, and adjustment ring 140 is secured by bolts 149 to support ring 138. Deflector ring 142 is positioned beneath adjustment ring 140 and retractably secured thereto by the plurality of pancake cylinders 144 positioned at radially spaced locations. More specifically, adjustment ring 140 has a downwardly depending portion 150 in which heads 152 of pancake cylinders 144 are securely clamped by bolts 153, and shafts 154 of pancake cylinders 144 are threadedly secured in deflector ring 142.

Noticeably absent from this embodiment is the presence of a shim in an adjustment gap 160 formed between depending portion 150 and deflector ring 142. Instead, depending portion 150 has a downwardly extending annular ridge 156, and deflector ring 142 has a complementary annular groove 157. In operation, a vertical surface 158 of ridge 156 slidably engages a vertical surface 159 of groove 157 to essentially seal off the major portion of gap 160 from the primary water flow, thus minimizing disturbances to the water flow while allowing automatic adjustment of the slot size (e.g., between height X' and X" in FIG. 13).

Figure 14:
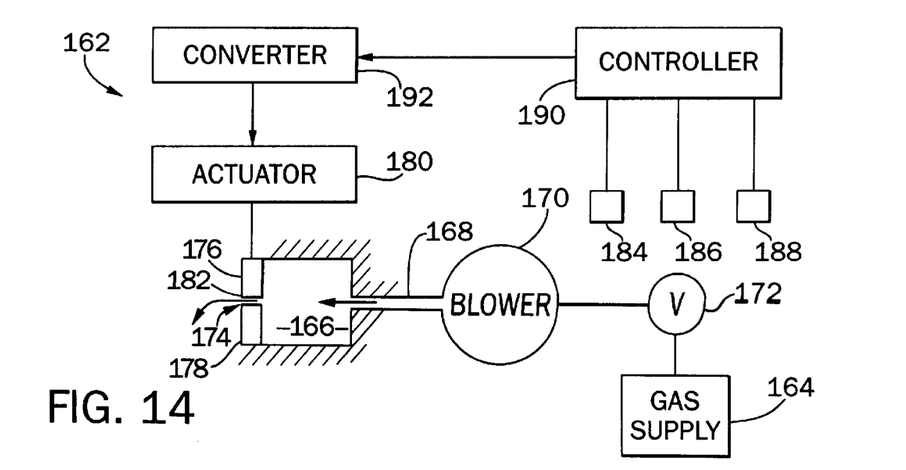
FIG. 14 is a block diagram of a closed-loop control system for automatically controlling the size of the slot.

Referring now to FIG. 14, a control system designated as 162 may advantageously be used with an actuator enabled embodiment of the present invention (such as illustrated and described with reference to FIG. 13). A gas supply 164 is fluidly coupled to a plenum chamber 166 through a supply line 168, and a blower (or compressor) 170 and a control valve 172 may advantageously be provided intermediate gas supply 164 and plenum 166 to facilitate gas flow or limit gas flow, respectively, through supply line 168. Plenum 166 has an adjustable discharge gap 174 formed between an upper member 176 and a lower member 178 in which at least one of members 176, 178 is motivated by an actuator 180. For example, upper member 176 may move vertically toward/away from lower member 178 (as described and illustrated in an earlier embodiment) or upper member 176 may deflect outwardly at a lower edge 182 thereof, thus forming a deflector plate for causing flow separation adjacent gap 174. Alternatively, upper member 176 could be one or more inflatable baffles in the shape of a continuous inflatable ring surrounding the entire perimeter or as a number of inflatable ring segments attached at discrete locations around the perimeter. The specific details of such inflatable baffles are further described in commonly assigned co-pending U.S. patent application Ser. No. 08/805,286, filed Feb. 25, 1997, the entire disclosure of which is incorporated herein by reference.

Control system 162 includes a plurality of sensors 184–188 designed to measure turbine speed, wicket gate position, power output, head water elevation, tail water elevation, head losses, water temperature, and dissolved gas level (such as oxygen) in the head and tail water, among other parameters. The electric signals generated by sensors 184–188 are sent to a controller 190, preferably via signal conditioning circuits. Controller 190 preferably includes a digital-based processor and required analog to digital conversion and signal scaling circuits.

The information provided by the various sensors is used in control algorithms allowing controller 190 to compute and generate various control signals. The control signals in turn are used to regulate the amount of gas (such as air, or some other oxygen containing gas) flowing through supply line 168, and the size of gap 174, thereby enhancing the dissolved gas/oxygen level of water passing through the turbine when needed, and otherwise limiting efficiency losses. To that end, the control signals generated by controller 190 are fed to a signal converter generally designated as 192. The signal from signal converter 192 is sent in the appropriate form to actuator 180 driving at least one of members 176 and 178.

Figure 15:
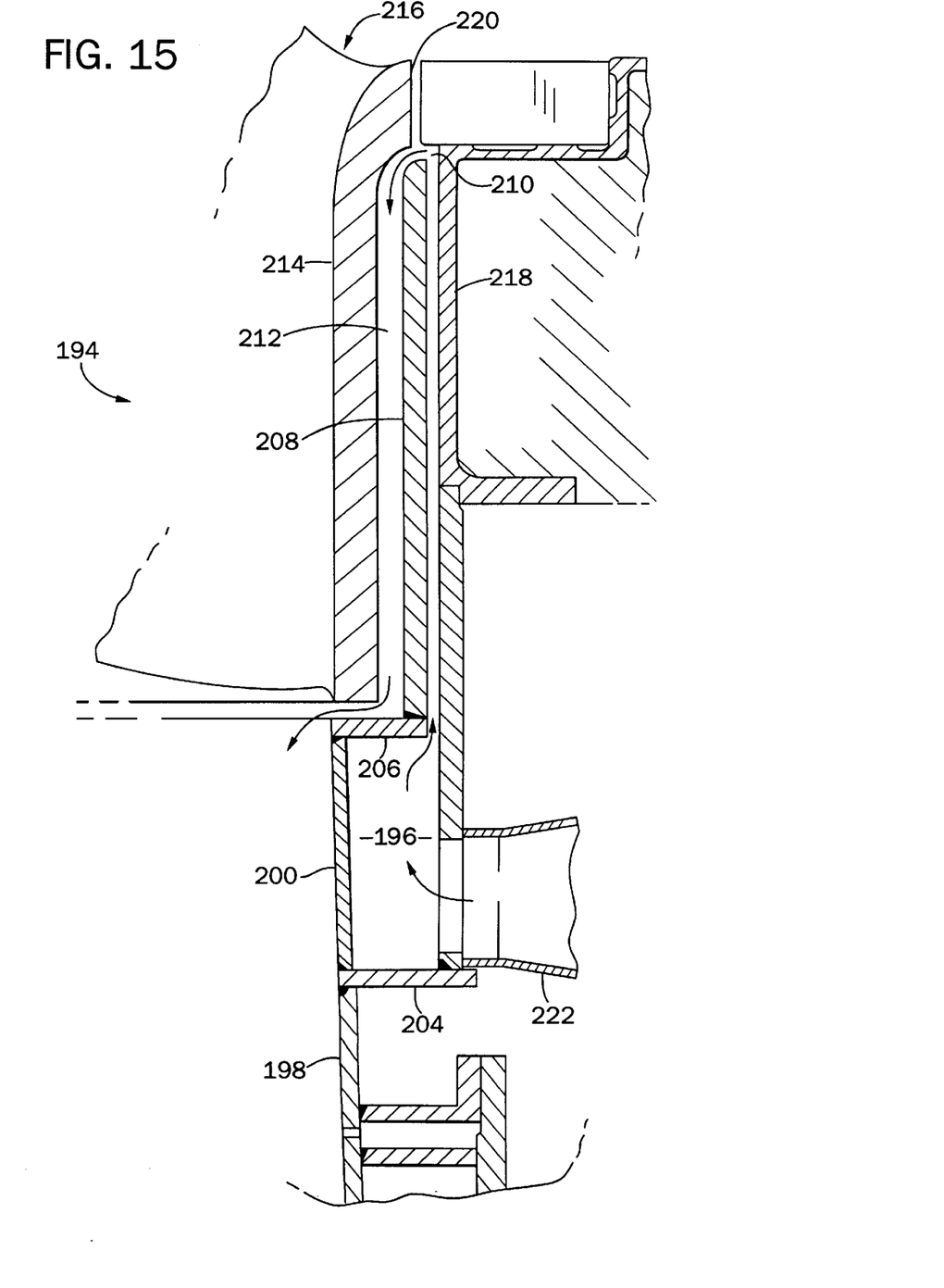
FIG. 15 is an enlarged cross-sectional view of an alternative plenum chamber having a vertical member extending upwardly between the rotating runner band and the stationary discharging ring to channel gas from the plenum into a mixing chamber.

Referring now to FIG. 15, a shrouded turbine 194 provided with an alternative plenum chamber 196 will be described. The description of turbine 194, however, will be generally limited to aspects thereof which differ from turbine installation 10 as described above, with the remaining aspects otherwise being substantially the same. Plenum chamber 196 extends around a periphery of a draft tube 198 and is integrally formed therewith. Preferably, plenum 196 is an annular chamber which extends uninterrupted around the entire cylindrical circumference of draft tube 198. Plenum 196 is formed by a liner plate 200, a discharge ring barrel 202, an annular bottom plate 204, and an annular top plate 206. In addition, plenum 196 includes an upwardly extending cylindrical member 208 which channels gas upwardly from plenum 196 to a gas discharge opening 210 situated at the upper end of an annular mixing chamber 212 formed between a band 214 of a rotating runner 216 and a concentric, stationary discharge ring 218. Opening 210 is preferably a continuous slot which extends uninterrupted throughout the entire annular extent of mixing chamber 212. Preferably, discharge opening 210 is offset radially outwardly from a leakage water flow which results from water flowing downwardly through a band seal 220 into mixing chamber 212. A gas source such as atmospheric air is in communication with plenum 196 through a gas inlet pipe 222.

With this alternative plenum arrangement, the gas is discharged as a cloud of gas bubbles in mixing chamber 212, and is continuously stirred by the rotation of runner 216 within the casing. More specifically, stirring takes place by natural fluid motion arising as a consequence of the formation of Taylor vortices and fluid sheer forces between the two concentric, relatively rotating cylinders of band 214 and upwardly extending cylindrical member 208. The specific details and advantages of discharging a gas into such mixing chambers are further described in U.S. patent application Ser. No. 08/805,286 mentioned above.

Although a variety of embodiments have been described herein, it should be understood that the above description is of preferred exemplary embodiments of the present invention, and that the invention is not limited to the specific forms described. For example, plenum configurations and locations need not be of the kind described above. In addition, the shapes and operations of the discharge slots and their position with respect to the plenum are particularly suitable to rearrangement. Such other constructions are, nevertheless, considered within the scope of this invention. Accordingly, these and other substitutions, modifications, changes and omissions may be made in the design and arrangement of the elements and in their method of operation as disclosed herein without departing from the scope of the appended claims.

What is claimed is:

1. A turbine installation configured to improve dissolved oxygen level in water passing through a water passage of a turbine, the installation comprising:
    a stationary casing for containing turbine components and defining the water passage, the casing extending from an upstream inlet port to a downstream outlet port and including a head cover, a discharge ring and a draft tube;
    a runner rotatably disposed in the casing so that water flowing therethrough impinges on the runner;
    a plenum chamber substantially surrounding a peripheral portion of the draft tube;
    a gas discharge slot connecting the plenum chamber to the water passage, the slot being substantially continuous and extending substantially around an entire circumference of the water passage; and
    an oxygen containing gas source connected to the plenum chamber, the plenum chamber containing gas at a higher pressure than a local water pressure adjacent the slot, whereby the plenum chamber remains substantially free of water and gas is discharged from the slot into the water passage so that the level of dissolved oxygen in the water discharged from the downstream port is increased.

2. The turbine installation of claim 1, wherein the plenum extends from the draft tube away from the water passage.

3. The turbine installation of claim 2, wherein the plenum is embedded in concrete surrounding the draft tube.

4. The turbine installation of claim 2, wherein the plenum is integrally formed with the draft tube.

5. The turbine installation of claim 2, wherein the plenum is formed by a plurality of members disposed between an upper end of the draft tube and a lower end of the discharge ring.

6. The turbine installation of claim 5, wherein the runner includes a band concentric with and spaced inwardly from the discharge ring which forms an annular mixing chamber therebetween, and wherein a generally cylindrical member extends upwardly from the plenum between the band and discharge ring to an annular gap through which gas is discharged into the annular mixing chamber.

7. The turbine installation of claim 5, wherein the members forming the plenum comprise:
    a first cylindrical member extending downwardly from the discharge ring;
    a second cylindrical member extending upwardly from the draft tube;
    a bottom annular member extending generally horizontally between the first and second members; and
    a ring assembly projecting radially inwardly from the first member to an annular region above the second member, the ring assembly including a downwardly depending portion aligned above the second member and spaced therefrom to form an annular gap through which gas is discharged into the draft tube.

8. The turbine installation of claim 7, wherein the depending portion is movable relative to the second member, whereby the gap is an adjustable size opening.

9. The turbine installation of claim 1, wherein the gas discharge slot is a continuous annular slot which completely circumscribes the draft tube.

10. The turbine installation of claim 9, wherein the annular slot varies in height around the draft tube to improve uniformity of gas discharge from the slot.

11. The turbine installation of claim 10, wherein the height of the annular slot at a section thereof is a function of distance from the section to a nearest gas supply line coupling the gas source to the gas chamber.

12. The turbine installation of claim 10, further including a plurality of shims of different thicknesses for defining the height of the annular slot which varies around the draft tube.

13. The turbine installation of claim 1, wherein the slot includes an upper edge movable relative to a lower edge thereof to define an adjustable size slot opening.

14. The turbine installation of claim 13, further including a control system for controlling the size of the slot opening.

15. The turbine installation of claim 13, further including at least one shim for defining the size of the slot opening.

16. The turbine installation of claim 1, further including means for causing flow separation and a local low pressure region in the water passage adjacent the slot to increase the amount of gas being discharged through the slot.

17. The turbine installation of claim 16, wherein the means for causing flow separation is selected from a group consisting of a deflector plate disposed upstream of the slot, a plurality of inflatable baffles disposed upstream of the slot, and a radial outward offset from an upstream edge of the slot to a downstream edge of the slot.

18. The turbine installation of claim 1, wherein the gas source is connected to the gas chamber by a plurality of spaced apart gas supply lines.

19. The turbine installation of claim 1, further including a blower for increasing the pressure of the gas within the gas chamber.

20. The turbine installation of claim 1, wherein the oxygen containing gas is air.

21. The turbine installation of claim 1, further including a drain pipe configured to remove water from the plenum chamber.

22. A hydraulic turbine adapted to enhance the dissolved oxygen level in water flowing through a water passage of the turbine, the turbine comprising:
    a rotatably mounted runner;
    a stationary casing including a head cover, a discharge ring surrounding the runner, and a draft tube downstream of the runner;
    a gas chamber surrounding at least a portion of the draft tube;
    a gas discharge outlet fluidly coupling the gas chamber to the draft tube, the outlet having an adjustable size discharge opening; and
    means for supplying an oxygen containing gas to the gas chamber at a pressure greater than a local water pressure in the interior of the draft tube adjacent the outlet, whereby the gas chamber remains substantially free of water and gas is discharged from the outlet into the draft tube so that the level of dissolved oxygen in the water flowing through the turbine is enhanced.

23. The turbine of claim 22, wherein the gas chamber is a continous chamber extending around the draft tube and the discharge opening is a continuous slot extending around the draft tube.

24. The turbine of claim 23, wherein the continuous slot is defined by an upper edge and a lower edge in which at least one of the edges is movable relative to the other edge for adjusting the size of the slot.

25. The turbine of claim 24, wherein the at least one edge moves primarily in a vertical direction for adjusting the size of the slot.

26. The turbine installation of claim 23, further including a plurality of shims of different thicknesses for providing the continuous slot with a height which varies around the draft tube.

27. The turbine of claim 22, wherein the gas chamber and the gas discharge outlet are defined by:
    a first cylindrical member extending downwardly from the discharge ring;
    a second cylindrical member extending upwardly from the draft tube and spaced radially inwardly from the first member;
    a bottom annular member extending substantially horizontally between the first and second members; and
    a ring assembly projecting radially inwardly from the first member to an annular region above the second member, the ring assembly including a downwardly depending portion aligned above the second member and movable relative thereto to form the adjustable size discharge opening.

28. The turbine of claim 22, further including a control system for automatically controlling the size of the discharge opening and thereby regulate the dissolved oxygen level in the water.

29. The turbine of claim 28, wherein the control system includes:
    a plurality of sensors selectively generating electrical signals indicative of at least the dissolved oxygen level in the water;
    an electrical controller for receiving and processing the electrical signals from the sensors and for generating control signals; and
    means for adjusting the size of the discharge opening responsive to the control signals to regulate the gas flowing through the gas discharge outlet.

30. The turbine of claim 29, wherein the controller is a digital-based processor capable of generating digital control signals, and wherein the control system further includes a digital-to-analog converter for converting the digital control signals to analog control signals.

31. The turbine of claim 29, wherein the sensors further selectively generate signals indicative of at least one of turbine speed, power output, head water elevation, tail water elevation and head losses.

32. The turbine installation of claim 22, further including at least one shim for defining the size of the discharge opening.

33. The turbine installation of claim 22, including a drain pipe configured to remove water from the gas chamber.

34. A turbine installation configured to improve dissolved oxygen level in water passing through a water passage of a turbine, the installation comprising:
    a turbine runner rotatably mounted in the water passage;
    a stationary casing enclosing the runner and defining the water passage, the casing including a head cover, a discharge ring surrounding the runner and a draft tube downstream of the runner;
    a gas chamber integrally formed with the draft tube;
    a gas discharge slot connecting the gas chamber to the water passage, the slot being substantially continuous and extending substantially around the water passage; and
    an oxygen containing gas source connected to the gas chamber including means for maintaining a gas pressure in the chamber at greater than a water pressure in the water passage adjacent the slot, whereby the gas chamber remains substantially free of water and gas is discharged from the slot into the water passage so that the level of dissolved oxygen in the water discharged from the downstream port is increased.

35. The turbine installation of claim 34, wherein the runner includes a band concentric with and spaced inwardly from the discharge ring which forms an annular mixing chamber therebetween, and wherein a generally cylindrical member extends upwardly from the gas chamber between the band and discharge ring to an annular gap through which gas is discharged into the annular mixing chamber.

36. The turbine installation of claim 34, wherein the gas discharge slot is an annular gap extending substantially around the draft tube.

37. The turbine installation of claim 36, wherein the annular gap is an adjustable size opening.

38. The turbine installation of claim 37, further including at least one shim for defining the size of the opening.

39. The turbine installation of claim 34, further including a drain pipe configured to remove water from the gas chamber.

* * * * *